United States Patent
Karg et al.

[11] Patent Number: 6,149,084
[45] Date of Patent: Nov. 21, 2000

[54] DEVICE FOR PREPARING COFFEE POWDER

[75] Inventors: Anton Karg, Ruetihof; Raffaele Puddu, Niederrohrdorf, both of Switzerland

[73] Assignee: Egro AG, Niederrohrdorf, Switzerland

[21] Appl. No.: 09/394,788

[22] Filed: Sep. 13, 1999

Related U.S. Application Data

[63] Continuation of application No. PCT/CH97/00106, Mar. 13, 1997.

[51] Int. Cl.[7] .................................................. B02C 19/12
[52] U.S. Cl. ........................ 241/100; 241/139; 241/224; 241/245; 241/257.1; 241/259.1
[58] Field of Search ..................... 241/100, 245, 241/246, 186.3, 224, 139, 257.1, 259.1

[56] References Cited

U.S. PATENT DOCUMENTS

| | | | |
|---|---|---|---|
| 5,201,474 | 4/1993 | Midden | 241/100 |
| 5,211,344 | 5/1993 | Albon | 241/100 |
| 5,690,283 | 11/1997 | Sandolo | 241/34 |
| 5,845,857 | 12/1998 | Haber et al. | 241/81 |

FOREIGN PATENT DOCUMENTS

| | | |
|---|---|---|
| 2418473 | 10/1975 | Germany. |
| 3021368 | 3/1982 | Germany. |
| 3343118 | 6/1984 | Germany. |
| 3535119 | 4/1987 | Germany. |
| 3903017 | 8/1990 | Germany. |

*Primary Examiner*—John M. Husar
*Attorney, Agent, or Firm*—Schweitzer Cornman Gross & Bondell LLP

[57] ABSTRACT

A coffee grinder which may be used in the hotel industry is positioned at an oblique angle to the vertical and makes it possible for several coffee grinders for different types of coffee to be accommodated in a minimal space. Coffee beans are fed into a grinding mill having fixed and rotating grinding wheels. The distance between the grinding wheels is adjustable. An ejection opening for discharge of the ground coffee powder allows the powder to be ejected tangentially and under the influence of gravity from the grinding mill.

11 Claims, 3 Drawing Sheets

618# DEVICE FOR PREPARING COFFEE POWDER

This application is a continuation of PCT/CH97/00106 filing date Mar. 13, 1997.

The present invention relates to a device for the preparation of coffee powder.

BACKGROUND OF THE INVENTION

Electric coffee grinders which dispense the coffee powder in portions are commonly known and are predominantly used in coffee machines in the catering trade, but increasingly also in offices and in the home. Devices of this type are relatively voluminous and/or generate noise caused by the deflection of the flow of beans and/or powder by the control elements necessary for this purpose.

DE-A-24 18 473 discloses a domestic grinder wherein the axis of the grinding mechanism forms an acute angle with the vertical so that the majority of the material to be ground passes directly between the grinding wheels where it is ground, and is ejected by the acting centrifugal forces. Assisted by gravity, the coffee powder flows into a positively connected receiving container.

The degree of grinding, i.e. the distance between the grinding wheels, is adjusted by an adjusting device arranged above the electric motor outside the bearing points. Despite the oblique position of the motor, this produces a relatively great overall height, and thus the grinder is not suitable for installation in compactly constructed coffee machines.

Therefore, an object of the present invention is to provide a device which has greater operational reliability and does not have the disadvantages of the prior art, and which has optimum material flow and does not generate noise when measuring out and/or ejecting the powder.

It is also an object of the invention to keep the overall height of the device low and to construct the device in such a manner that it can be associated with an existing brewing assembly in a coffee machine in a space-saving manner.

BRIEF DESCRIPTION OF THE INVENTION

In accordance with the foregoing and other objects and purposes, in a coffee grinder of the present invention the grinding wheels are arranged vertically or form an acute angle with the vertical, the coffee beans being fed in statically via a discharge funnel substantially unilaterally between the grinding wheels.

A pair of grinding wheels, one fixed and the other rotating, are provided, the distance between the wheels being adjustable. Feeding in the coffee beans statically and unilaterally reduces the danger of the grinding wheels becoming jammed. The beans pass substantially into a lower region of the grinding mechanism owing to vertically acting gravitational force, with the result that there is sufficient room left for their displacement and distribution over both grinding wheels. In addition, the driving power of the electric motor can be reduced, and the coffee grinder operates with a lower required torque.

The grinding time can be preselected. This improves the reproducibility of the quantity of coffee powder in relation to feeding the beans in co-axially.

The necessary overall height can be considerably reduced by locating an adjustment device in a region between the motor stator and the grinding mechanism. A further advantage consists in that the thermal expansion which occurs during operation of the coffee grinder is absorbed by the grinding-mechanism housing; the grinding gap between the grinding wheels does not change.

An adjusting device in the form of a bearing flange and a ball bearing is particularly advantageous and economical to produce. Simple adjustment by means of a simple adjusting tool—a cylindrical pin—may be provided for.

Axial bearing clearance may be compensated for by the incorporation of a compression spring to load the bearing flange. The grinding mechanism retains its pre-adjusted setting and thermal expansions are compensated for. In addition, the resulting locking of the adjusting wheel ensures that it retains its position even in the event of vibration.

Adjusting the quantity of coffee powder dispensed by adjusting the grinding time has proved successful.

The kinetic energy of the freshly ground coffee powder is very great owing to the centrifugal forces generated by the rotating grinding wheel. A blade of spring steel may be provided to absorb a substantial amount of the energy and prevents soiling of a coffee machine connected downstream.

A dual cylindrical coffee-powder ejection opening may be provided. It absorbs all the kinetic energy of the ground coffee powder and, with appropriate dimensioning, fills up without causing reflux onto the grinding mechanism. The use of two hollow cylinders pushed one inside the other can produce a slot-type closure which can easily he moved, even in the case of fine coffee powder.

By means of a vibration element, for example a piezo element powered by a small HF generator, evacuation of the coffee-powder ejection opening can be improved.

Particularly in the case of larger coffee machines, there is a desire to use two or more different types of coffee, and thus the division of the bean container can prove advantageous.

The use of a controllable tilting funnel, allowing simplification of the brewing assembly connected downstream, is particularly economical.

BRIEF DESCRIPTION OF THE DRAWINGS

A fuller understanding of the invention will be achieved upon consideration of the following embodiments of the subject of the invention with reference to the drawings, wherein.

In the figures, like parts are provided with like reference numerals.

DETAILED DESCRIPTION OF THE INVENTION

Figure 1:
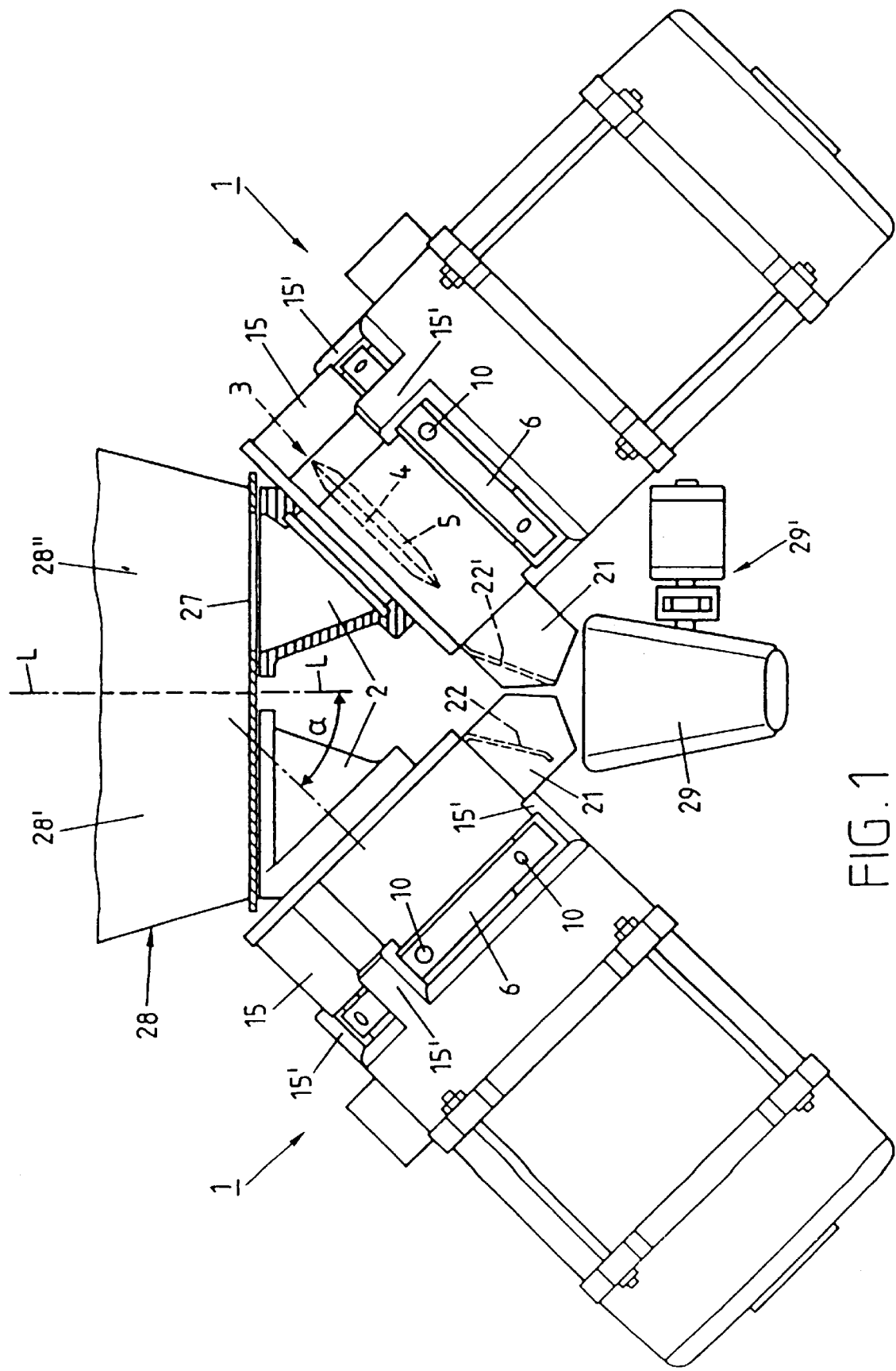
FIG. 1 is an elevation view of an embodiment of the invention having two coffee grinders arranged in a coffee machine.

In FIG. 1, coffee grinders are designated by the reference numeral 1. They are arranged at right angles to one another, at an angle $\alpha$ of 45° to the vertical L, and their two discharge funnels 2 are flanged to a bean container 28, comprising two chambers 28', 28", via a selector disc 27.

FIG. 1 also shows a grinding mechanism 3 comprising two grinding wheels 4 and 5 arranged in a grinding-mechanism housing 15. Part of a rotatable bearing flange 6 provided with bores 10 is visible in a recess in the housing 15 formed by connecting members 15'.

The two grinding mechanisms 3 have identical coffee-powder ejection openings 21 with spring blades 22 and 22', indicated by broken lines. The ejection openings 21 open into a tilting funnel 29 provided with an adjusting mechanism 29', which supplies brewing chambers (not shown) therebelow.

Figure 2:
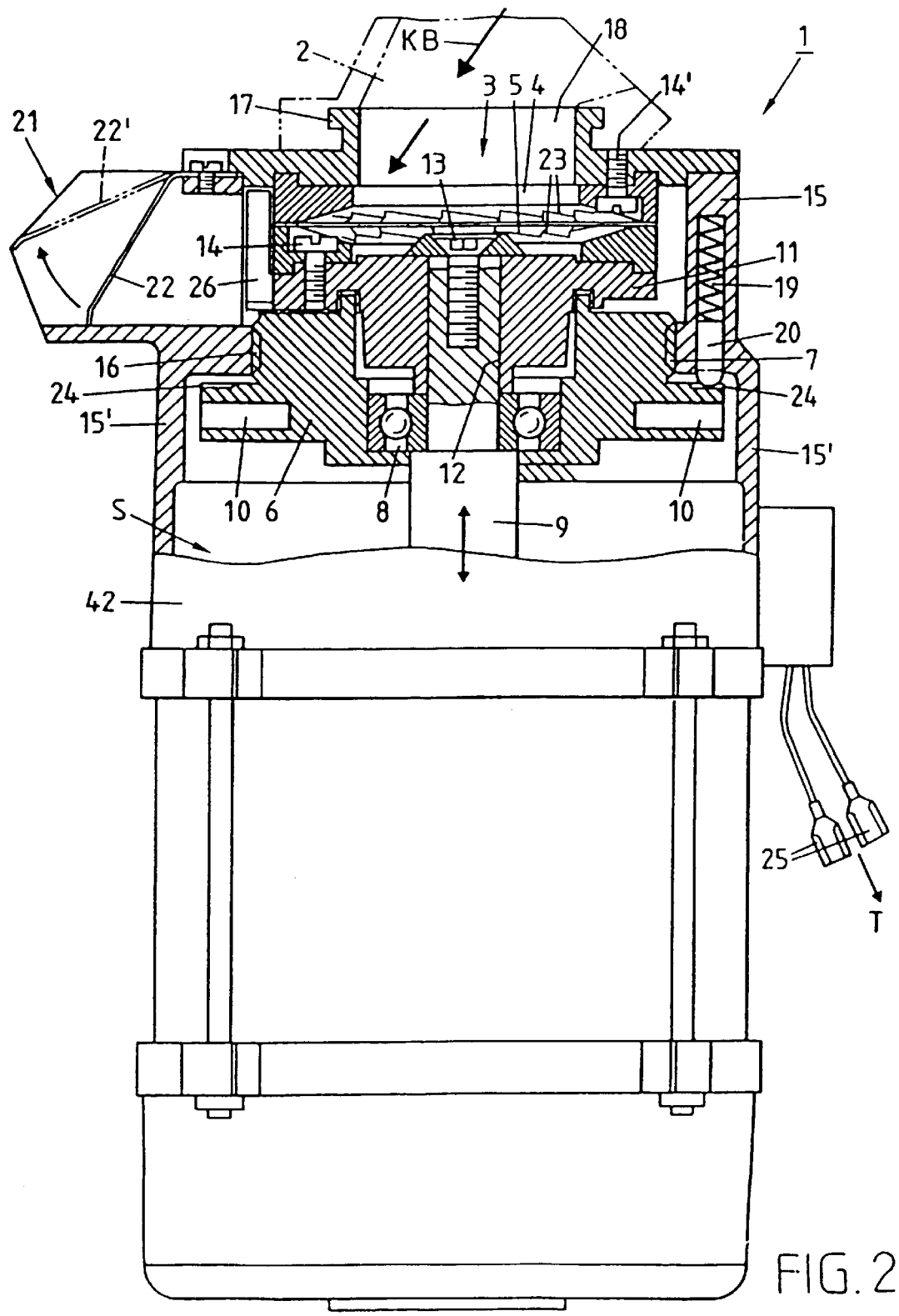
FIG. 2 is a detail cross-sectional view of one of the two coffee grinders according to FIG. 1.

FIG. 2 is a partial sectional view of the coffee grinder 1 arranged on the right-hand side. The coffee-powder ejection opening 21 with its spring blade 22 can again be seen on the left-hand side, the spring blade 22 also being shown in phantom in its ejection position 22' deflected in the direction of the arrow. The opposing connecting members 15' of the housing 15 can be seen at the housing edges; inside, the bearing flange 6 is shown with its axial bores 10 and thereabove locating grooves 24 formed as recesses. The bearing flange 6 is provided with an external thread 7 and is screwed into a mating internal thread 16 of the grinding-mechanism housing 1b. A standard ball bearing 8, which is mounted with its outer ring in the bearing flange 6, is arranged on the central motor shaft 9. A mounting flange 11, on which the lower, rotating grinding wheel 5 of the grinding mechanism 2 is centrally fixed by means of three peripheral fixing screws 14, is arranged above the bearing flange 6 in a larger bore thereof. The fixed grinding wheel 4 with its fixing screws 14 is arranged a short distance above the rotating grinding wheel 5 and is screwed centrally to the upper grinding-mechanism flange 17. The grinding wheels 4 and 5 are provided with grinding teeth 23 in a known manner.

The rotating grinding wheel's mounting flange 11 is fixed to the motor shaft 9 in a centering bore 12 in the motor shaft with a central screw connection 13. The discharge funnel 2 arranged thereabove is indicated in phantom. The feed opening for coffee beans KB is designated by 18.

It can be seen from FIG. 2 in conjunction with FIG. 1 that the coffee beans KB slide down vertically, i.e. due to gravity, unilaterally between the grinding wheels 4, 5, and that space is consequently provided for their displacement in the upper part of the grinding mechanism 3, preventing the grinding wheels 4, 5 from jamming.

The plate-shaped bearing flange 6 is also provided with recesses, producing locating grooves 24 in which three radially arranged, cambered pins 20 engage and which are loaded by springs 19.

A terminal has with electrical connections 25, which lead to a time-controlled power source T, is provided on a side of a commonly known motor of the coffee grinder 1.

It can also be seen from FIG. 2 that, by rotating the bearing flange 6 by means of e.g. a cylindrical pin, the flange 6, with its ball bearing 8, the shaft 9 and the grinding wheel 5, is axially displaced in the direction of the arrow relative to the stator S of motor housing 42, and that the cambered pins 20 are temporarily lifted from the locating grooves 24. This produces specific adjustment of the degree of grinding and also prevents unwanted adjustment in the event of vibration.

The quantity of powder dispensed is preferably determined by temporal control of the grinding time by means of a suitable power source T with a commonly known pulse counter. The connection to the power source T is produced via plug-in connections 25.

It can also be seen from FIG. 2 that the spring blade 22 acts as a dynamic brake for the freshly ground coffee powder cast from the grinding mechanism 3 and that it is deflected by the powder in the direction of the arrow into the position of the spring blade 22'.

Figure 3:
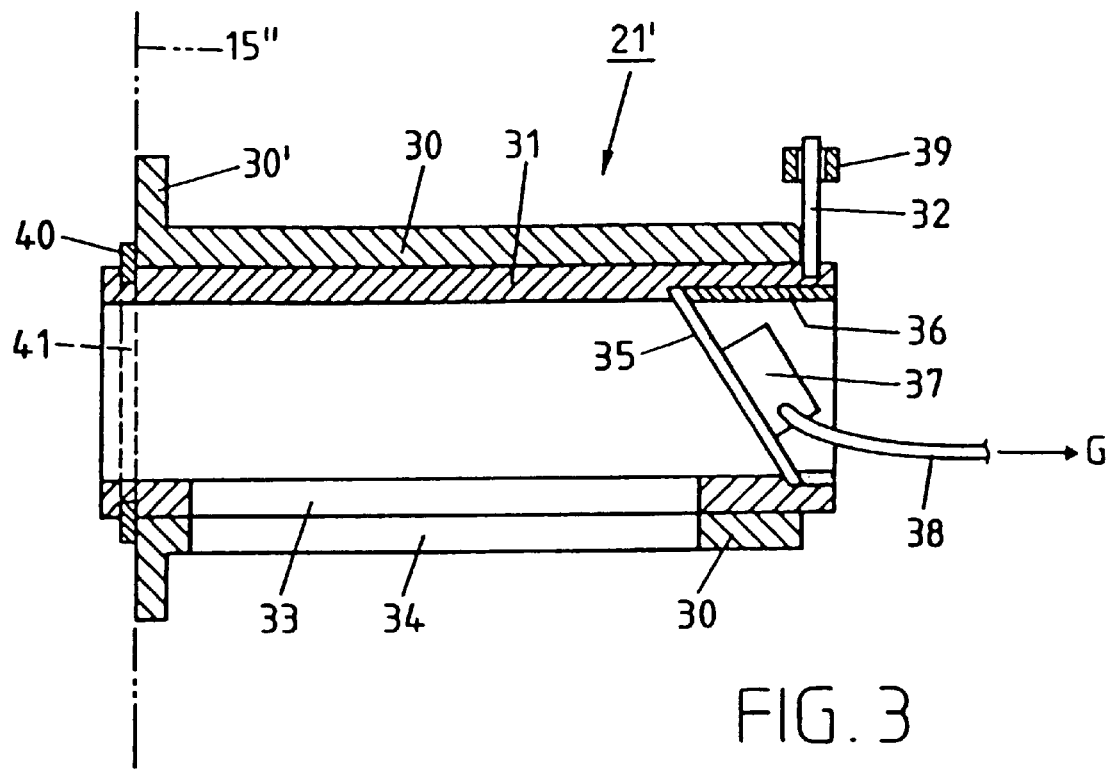
FIG. 3 is a further detail view of a controlled coffee-powder ejection opening with a vibration element.

The coffee-powder ejection opening 21' depicted in FIG. 3 represents an improvement over the ejection opening 21 and permits the complete evacuation thereof. This ejection opening 21' is mounted by means of a flange 30' on a grinding-mechanism housing 15", which has been slightly modified in relation to FIG. 2, and comprises an ejection pipe 30 inside which an ejection cylinder 31 is rotatably mounted. The ejection cylinder 31 is provided with an annular groove 41 at a first side into which a shaft securing means 40 (Seger ring) is inserted, and is axially secured on the opposite side by a swivelling lever 32.

Figure 4:
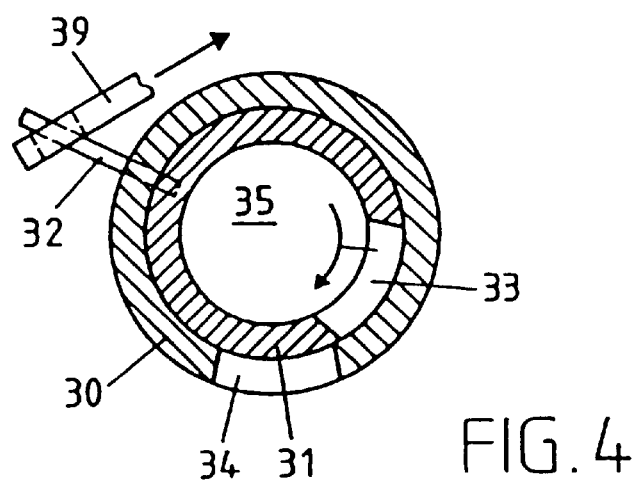
FIG. 4 is a sectional view perpendicular to the longitudinal axis of FIG. 3, with the ejection slots closed.

The ejection pipe 30 and the ejection cylinder 31 have ejection slots 33, 34 which are closed by rotation as shown in FIG. 4 and opened by rotation according to FIG. 3. This process is carried out via a swivel arm 39 which is connected to an electromagnet (not shown) in the direction of the linear arrow in FIG. 4 and rotates the swivelling lever 32 through approximately 90°.

For improved evacuation of the coffee-powder ejection opening 21', the latter is provided according to FIG. 3 with a vibration element 35, on which is mounted a piezo element 37 connected via a feeder cable 38 to a known HF (high frequency) generator G, by means of which the piezo element 37 and the vibration element 35 vibrate in resonance.

Although the presented embodiment of the invention relates to dispensing by predetermining or preselecting the grinding time, the subject of the invention can also be used in connection with volumetric dispensing devices.

A preferred use of the arrangement shown is in a very compact, attractively constructed coffee machine for the catering trade as set forth in patent application PCT/CH97/00105.

We claim:

1. A device for the preparation of coffee powder, comprising a container for coffee beans, a grinding mechanism with an electric motor and a dispensing device for ground coffee powder, the grinding mechanism comprising one fixed and one rotating grinding wheel coupled to the motor, each grinding wheel having internal grinding teeth, an adjustment device for varying the distance between the grinding wheels, the dispensing device being provided tangentially and radially outside the grinding wheels, a discharge funnel for feeding the coffee beans substantially unilaterally between the grinding wheels, and an ejection opening for flowing the resulting coffee powder tangentially assisted by gravity, the adjusting device comprising a bearing flange located between the motor and the grinding mechanism for the grinding mechanism.

2. A device according to claim 1, characterized in that the device further comprises a grinding mechanism housing having an internal thread portion, the bearing flange having an external thread matable with the internal thread portion and a ball bearing, the bearing flange (6) being mounted upon the internal thread portion in an axially adjustable manner.

3. A device according to claim 2, characterized in that the grinding-mechanism housing (15) is connected via connecting members (15') to a motor housing (42) at the front, and in that bores (10) are provided in the edge region of the bearing flange (6) in the axial direction for the engagement of an adjusting tool.

4. A device according to claim 3, characterized in that at least one compression spring (19) is provided which loads the bearing flange (6) in the axial direction.

5. A device according to claim 1, characterized in that the dispensing of the coffee powder in portions is carried out by reproducible preselection of the grinding time.

6. A device according to claim 1, characterized in that a spring blade (22) is arranged as a dynamic powder brake in the coffee-powder ejection opening (21).

7. A device according to claim 6, characterized in that the coffee-powder ejection opening (21') is cylindrical in shape and is closed at one end, and in that a powder outlet (33, 34) is provided in its cylindrical casing (30, 31).

8. A device according to claim 7, characterized in that the coffee-powder ejection opening (21') is formed as two hollow cylinders (30, 31) pushed one inside the other and provided with powder outlets (33, 34), the powder outlets being mutually displaced during the grinding process and being aligned thereafter by rotation.

9. A device according to claim 8, characterized in that a vibration element (35, 37) is connected to the inner hollow cylinder (31).

10. A device according to claim 1, characterized in that at least two chambers (28', 28") are provided in the container (28) for different types of coffee.

11. A device according to claim 10, characterized in that at least two grinding mechanisms (3) are associated with the container (28), a controllable tilting funnel (29, 29') being connected downstream of the grinding mechanisms (3).

* * * * *